(12) United States Patent
Piccoli et al.

(10) Patent No.: US 8,225,910 B2
(45) Date of Patent: Jul. 24, 2012

(54) DEVICE FOR CONTROLLING THE PISTON ROLL-BACK

(75) Inventors: Mauro Piccoli, Brembate di Sopra (IT); Luca Gelfi, Casirate D'Adda (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 863 days.

(21) Appl. No.: 12/094,032

(22) PCT Filed: Nov. 16, 2005

(86) PCT No.: PCT/IT2005/000667
§ 371 (c)(1),
(2), (4) Date: Jul. 25, 2008

(87) PCT Pub. No.: WO2007/057929
PCT Pub. Date: May 24, 2007

(65) Prior Publication Data
US 2009/0145701 A1    Jun. 11, 2009

(51) Int. Cl.
*F16D 65/52* (2006.01)
*F16D 65/74* (2006.01)

(52) U.S. Cl. ............... 188/71.8; 188/196 A; 188/196 P (58) Field of Classification Search .......... 188/71.7, 188/71.8, 196 R, 196 P, 196 A
See application file for complete search history.

(56) References Cited

U.S. PATENT DOCUMENTS

| | | | | |
|---|---|---|---|---|
| 3,277,983 A | * | 10/1966 | Jeffries | 188/196 P |
| 4,334,597 A | * | 6/1982 | Tovagliaro | 188/71.8 |
| 4,336,746 A | | 6/1982 | Morith et al. | |
| 4,375,842 A | * | 3/1983 | Melinat | 188/71.8 |
| 4,382,492 A | * | 5/1983 | Ritsema | 188/71.8 |
| 4,386,682 A | * | 6/1983 | Woo et al. | 188/71.8 |
| 5,172,921 A | * | 12/1992 | Stenlund | 277/300 |

FOREIGN PATENT DOCUMENTS

| | | |
|---|---|---|
| CN | 2474811 | 1/2002 |
| EP | 0092896 | 11/1983 |
| EP | 0140549 | 5/1985 |
| JP | 64 21826 | 1/1989 |
| JP | 05 065929 | 3/1993 |
| JP | 09 060666 | 3/1997 |

* cited by examiner

*Primary Examiner* — Thomas J Williams
(74) *Attorney, Agent, or Firm* — Shoemaker and Mattare (57) ABSTRACT

A device for controlling roll-back of a piston in a brake caliper includes a bush coaxial with and external to the piston. The bush has an outer sealing surface, and a scraper element seated in the caliper body acts against the sealing surface of the bush. An elastic element between the bush and the piston has a elastic constant selected so as to provide an elastic force on the piston substantially weaker that the axial friction force exerted by the scraper element. When the piston is pushed out of its piston seat, the piston packs the elastic means or abuts against the bush before relative sliding occurs between the scraper element and the outer sealing surface of the bush.

13 Claims, 13 Drawing Sheets

DEVICE FOR CONTROLLING THE PISTON ROLL-BACK

The present invention relates to a device for controlling the piston roll-back, suitable to be used in brake callipers of the type comprising a body located astride of a brake disc, wherein said disc comprises an axis of rotation and opposed friction surfaces. Pads are seated into said calliper body so as to slide in axial direction relative to the disc to respectively act on the opposed friction surfaces. Said calliper body further comprises at least one seat suitable for sealingly seating a piston, in turn suitable for influencing at least one of said pads against the friction surfaces of the disc, when said piston is stressed towards said pad.

In particular, the device for controlling the piston roll-back allows returning the piston into the seat of the calliper body when the stress exerted thereon, for example by a brake fluid, ends.

JP 64-21826 U and JP 09-060666 A2 teach the use of a gasket acting on the piston as roll-back element thereof. This gasket is seated in a seat of the inner surface of the cylinder and acts pressure-wise on the piston so as to deform in the piston direction of movement, remaining with a surface in contact with the piston while the latter moves under the stress of the brake fluid pressure. As the brake fluid stress on the piston ends the gasket, elastically and axially deformed by the piston, resumes its original shape, pulling the piston inside the cylinder. If the pad influenced by the piston wears during the braking action beyond the gasket limit of deformation, the piston starts to slide under the deformed gasket, thus compensating the worn extent of the pad. At the end of the braking action, the piston is recalled by the gasket only by the extent equal to its deformation.

JP 05-065929 A teaches the installation of a gasket acting on the piston into a slot that allows the deformation thereof in the piston direction of movement. The slot is shaped as a ring in turn seated with an opposed sealing gasket into a seat of the calliper body external to the cylinder. The ring is pre-loaded with a Belleville washer so as to allow a gasket deformation without a movement of the ring if the piston is moved in extraction. The Belleville washer allows a ring movement if the stress exceeds the pre-load value thereof.

Even though these known devices for controlling the piston roll-back are satisfactory from a number of viewpoints, exhibit an intrinsic operating variability associated to the variable behaviour of the gasket, for example upon the variation of the operating temperature, which in brake callipers exhibits variations of even several dozens centigrade degrees, especially if racing vehicles are used, and also an operating variability associated to the construction tolerances of the gasket seat, which influence the gasket deformation extent and gradualness.

The object of the present invention is to propose a device for controlling the piston roll-back which should solve the disadvantages of the prior art and allow a repeatable operation.

This object is achieved by a device for controlling the roll-back of a piston for brake calliper as described in claim 1, as well as by an operating method as described in claim 85.

Further features and advantages of the device according to the invention will appear more clearly from the following description of preferred embodiments thereof, given by way of a non-limiting example with reference to the annexed figures, wherein:

FIG. 5 shows an axonometric exploded view of the piston of FIG. 3 with some of the components of the scraper element.

In the following description, reference is made to "axial direction" to indicate a direction coinciding with or parallel to, the axis of rotation of the brake disc; to "hub direction" to indicate the side of a direction facing the hub or the interior of a vehicle; to "direction of the wheel" to indicate the side of a direction facing the wheel of a vehicle; to "radial direction" to indicate a direction coinciding with or parallel to a radial direction of the brake disc; to "extraction" or "advance" or "exit" to indicate the direction of the piston path out of its seat provided in the calliper body; to "roll-back" or "recall" or "return" to indicate the direction of the piston path into its seat provided in the calliper body; to "scraper" to indicate the element that acts pressure-wise on a surface to prevent material from moving from one side to the other of such element, for example an element of synthetic material acting with a plane surface thereof on a sealing surface; to "pack" or "presses to pack" to indicate the operation of compressing, for example, an elastic element up to move the elements thereof in contact, limiting the compression stroke.

In accordance with a general embodiment of a device for controlling the roll-back of a piston for brake calliper, said brake calliper 1 comprises a calliper body 2 arranged astride of a brake disc 3 having an axis of rotation 4 and opposed friction surfaces 5. Brake calliper 1 seats pads 6 into the calliper body 2 so as to allow a sliding thereof in axial direction relative to brake disc 3 and an action thereof on said opposed friction surfaces 5.

Said calliper body 2 further comprises at least one piston seat 7 suitable for sealingly seating a piston 8 suitable for influencing at least one of said pads 6 against said friction surfaces 5 of brake disc 3, when said piston 8 is stressed towards said pad.

Advantageously, said piston 8 comprises a piston body 9 and a bush 10 coaxially arranged outside of said piston body 9.

Preferably, a scraper element 11, suitable for cooperating with piston 8, is seated in a seat 12 that substantially prevents the deformation thereof in the piston movement direction, or axial direction, while the piston is operating. Said scraper element 11 acts on at least one of the piston components, alternately piston body 9 or bush 10, with a pressure suitable for determining an action of resistance to the piston movement. In other words, the scraper element 11 exerts, on a sealing surface 13 of the piston, provided on the piston body or, optionally, on the bush, a friction action that temporarily makes the scraper integral with the piston component on which it acts, until a thrust threshold of the brake fluid is exceeded.

Elastic means 14 are further provided, suitable for elastically influencing at least said bush and suitable, when stressed by the piston movement, to elastically yield until they pack up or up to an abutment position of the piston.

Advantageously, said elastic means 14 exhibit a predetermined elastic constant that determines an elastic action on the piston. This elastic action stresses piston 8 in roll-back into the seat thereof, and is easily overcome by the braking action exerted by the brake fluid pressure on the piston.

This elastic action of the elastic means 14 is of predetermined extent and is substantially weaker than the movement resistance action exerted by said scraper element 11, so that during the movement of piston 8, said scraper element 11 allows a relative sliding between itself and the piston component on which it acts only after the elastic means have reached the maximum packing yield or the component stressing them has reached the abutment. In other words, during the action of the brake fluid on piston 8, the elastic means yield first, until they reach a predetermined value, given by their packing or by a predetermined abutment, and only after that, a relative sliding occurs between scraper and piston component on which this scraper acts.

In accordance with an embodiment, the action of elastic means 14 is weaker than the friction action of the scraper element 11 but stronger than the action of even any further sealing elements 26.

During the relative sliding between scraper element 11 and piston component on which it acts, any considerable deformation in the piston direction of movement, or axial direction, of the scraper element is avoided.

In other words, when the braking action of the brake fluid ends, irrespective of the roll-back of the piston into its seat due to the elastic means, the scraper element exhibits no substantial axial deformation capable of substantially recovering or rolling-back the piston. In yet other words, the scraper element does not participate in the piston return into its seat.

In accordance with a general embodiment, said piston 8 exhibits a roll-back stopping surface 15 of the piston stressed by the elastic means 14, said surface being suitable for cooperating with a roll-back abutment surface 16 for limiting the return of elastic means 14 on piston 8, limiting the roll-back of piston 8 into the piston seat 7 to a predetermined extent "R" or roll-back.

In accordance with an embodiment, the device for controlling the roll-back of a piston for brake calliper is comprised in a brake calliper 1 comprising a calliper body 2 arranged astride of a brake disc 3 comprising an axis of rotation 4 and opposed friction surfaces 5. Said calliper further comprises pads 6 seated into said calliper body so as to axially slide relative to the brake disc to act against said friction surfaces. The calliper comprises at least one piston seat 7 formed in the calliper body 2. At least one piston 8 is sealingly seated into said piston seat 7 so as to be stressed by a brake fluid coming out of said seat for influencing at least one of said pads 6 against the opposed friction surface 5 of the brake disc 3. Said piston 8 comprises a piston body 9 and a bush 10, arranged coaxial to said piston body 9. Said bush 10 is arranged external to said piston body 9 and exhibits an outer sealing surface 13, on which scraper element 11 acts. A scraper element 11 is seated in a seat 12 provided in calliper body 2 so as to act pressure-wise against said sealing surface 13 of bush 10. Said seat 12 of the scraper element is shaped so as to substantially prevent an axial deformation of the scraper element during a relative sliding movement between said scraper element 11 and said sealing surface 13.

Elastic means 14 are provided between said bush 10 and said piston body 9 and are suitable for elastically and axially influencing said bush and said piston body in reciprocal moving apart. When stressed by the movement of piston 8, said elastic means 14 are suitable for elastically yielding up to packing, that is, for compressing up to a condition of maximum compression, or up to moving said piston body 9 to an abutment position against said bush 10. Said elastic means 14 exhibit a predetermined elastic constant that determines an elastic action on piston 8 substantially weaker than the axial friction action exerted by the scraper element 11 so that, when piston 8 is stressed out of its piston seat 7, piston body 9 packs said elastic means 14 or moves in abutment against said bush 10 before a relative sliding occurs between said scraper element 11 and said outside sealing surface 13 of bush 10.

In accordance with an embodiment, said piston body 9 comprises a stopping surface 15 suitable for interacting with an abutment surface 16 of bush 10 for limiting the return of piston body 9 into piston seat 7 to a predetermined extent, a return determined by the action of elastic means 14 as the pressure of the brake fluid ends (FIGS. 1 to 16).

In accordance with a further embodiment, said brake calliper 1 comprises a calliper body 2 arranged astride of a brake disc 3 comprising an axis of rotation 4 and opposed friction surfaces 5. Said calliper comprises pads 6 seated into said calliper body 2 so as to axially slide relative to said brake disc 3 to act against said friction surfaces 5. The calliper further comprises at least one piston seat 7 formed in the calliper body 2 and at least one piston body 9 sealingly seated into said piston seat 7 so as to be stressed by a brake fluid coming out of said seat 7 for influencing at least one of said pads 6 against the opposed friction surface 5 of brake disc 3. Said piston body 9 externally comprises a sealing surface 13. At least one bush 10 is provided coaxial and external to said piston body 9, said bush 10 being freely seated into a seat 22 provided in the calliper body 2. At least one stopping element 23 is removably provided and firmly secured to the calliper body 2 for partially closing seat 22 seating said bush 10. Advantageously, said stopping element 23 is removably secured to calliper body 2 by an adhesive 24 or welding.

Preferably, a scraper element 11 is seated in a seat 12 provided in said bush 10 so as to allow said scraper element 11 to act pressure-wise against said sealing surface 13 of the piston body 9, said seat being further shaped so as to substantially prevent an axial deformation of the scraper element 11 during a relative sliding movement between said scraper element 11 and said sealing surface 13.

Figure 19:
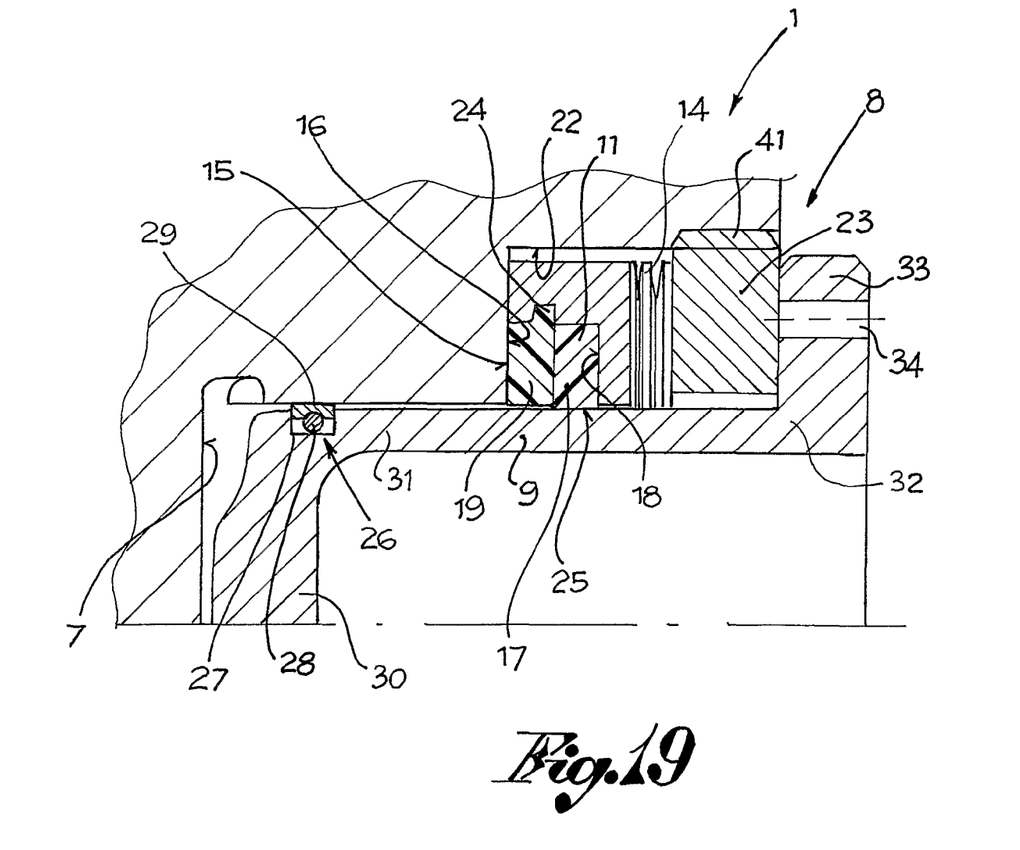
FIG. 19 shows a cross section detail of a brake calliper at the cylinder-piston unit according to a further embodiment.
Figure 20:
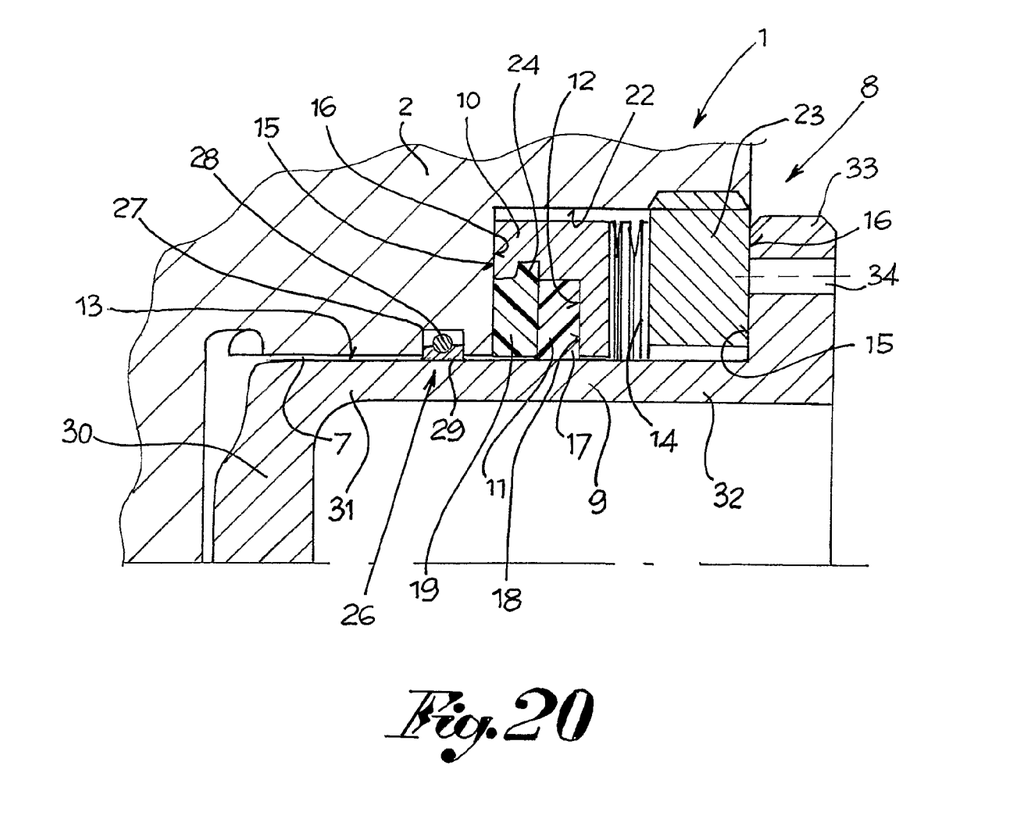
FIG. 20 shows a cross section detail of a brake calliper at the cylinder-piston unit according to yet another embodiment.
Figure 21:
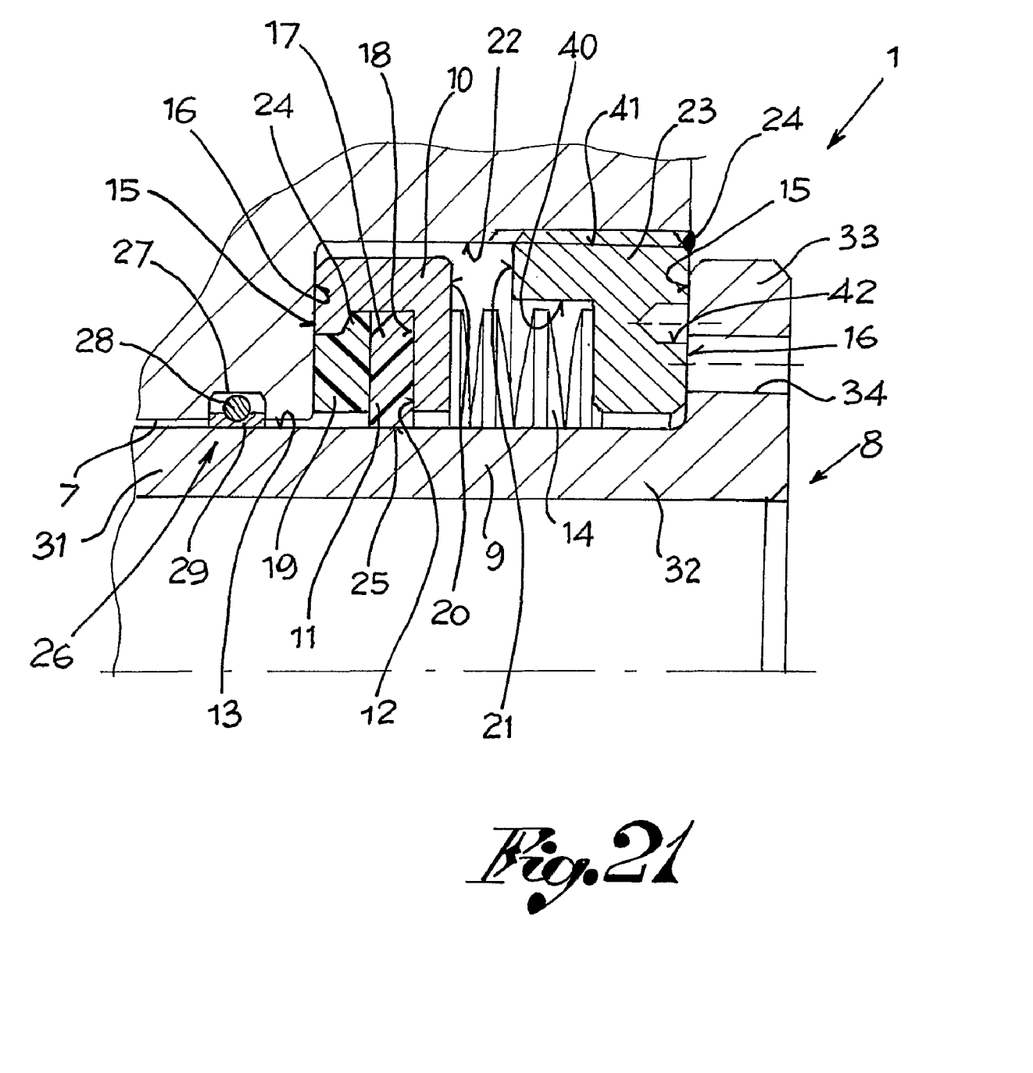
FIG. 21 shows a cross section detail of a brake calliper at the cylinder-piston unit according to yet another embodiment, FIGS. 22 and 23 schematically show a cross section detail of a brake calliper at a cylinder-piston unit in four two steps, and FIGS. 24 and 25 schematically show a further cross section detail of a brake calliper at a cylinder-piston unit in four two steps, according to yet another embodiment.
Figure 22:
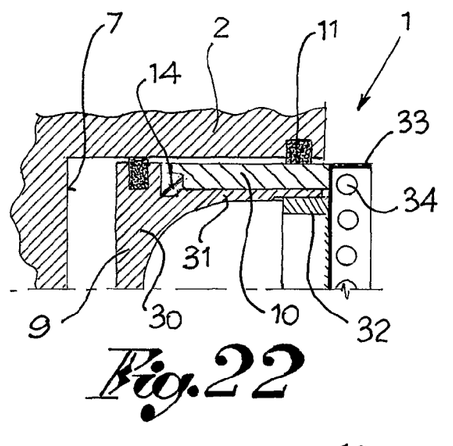
Figure 23:
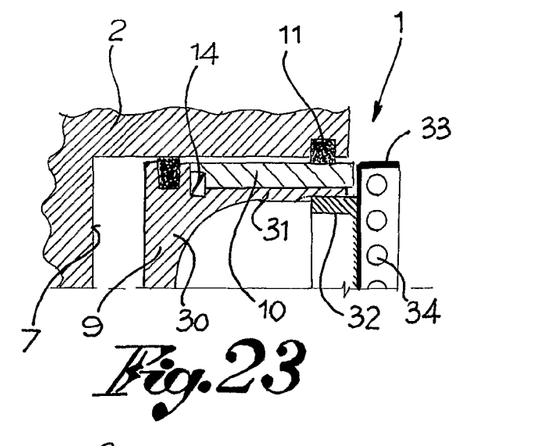
Figure 24:
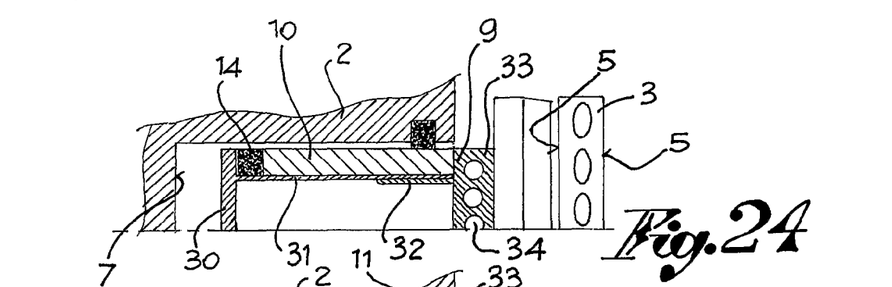
Figure 25:
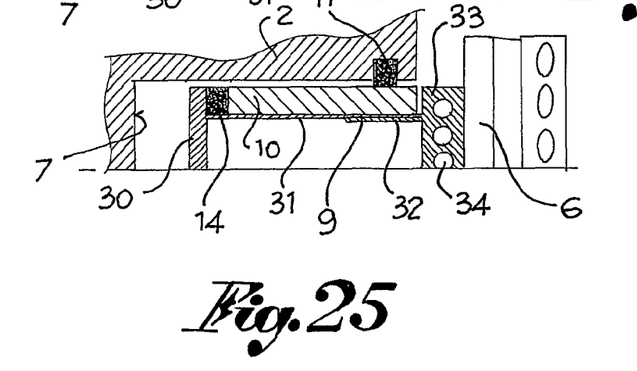

Advantageously, elastic means 14 are provided between said bush 10 and said stopping element 23, said elastic means 14 being suitable for elastically and axially influencing said bush 10 away from said stopping element 23 (FIGS. 19 to 21).

When stressed by the movement of the piston body 9, said elastic means 14 are suitable for elastically yielding up to packing or to moving said bush 10 to an abutment position against said stopping element 23. Said elastic means 14 exhibit a predetermined elastic constant that determines an elastic action on bush 10 substantially weaker than the axial friction action exerted by the scraper element 11 so that, when piston body 9 is stressed out of its piston seat 7, piston body 9 packs said elastic means 14 or moves said bush 10 in abutment against said stopping element 23 before a relative sliding occurs between said scraper element 11 and said outside sealing surface 13 of piston body 9.

In accordance with an embodiment, said bush 10 comprises a stopping surface 15 suitable for interacting with an abutment surface 16 provided in the calliper body 2 for limiting the return of piston body 9 into piston seat 7 to a predetermined extent, a return determined by the action of elastic means 14 as the pressure of the brake fluid ends.

Advantageously, said scraper element 11 comprises scraper means 17 contained in a seat 18 so that an active end of the scraper means exhibits an action surface in pressure contact with an opposed sealing surface 13.

Preferably, said scraper element 11 comprises containment means 19 suitable for containing said scraper means 17 into seat 18, preventing them from axially deforming during the movement of piston 8.

Advantageously, said scraper means 17 are a gasket.

Preferably, said containment means 19 are a containment ring.

According to an embodiment, said containment ring 19 forms a side wall of the containment seat of the scraper means 17. Advantageously, said containment ring 19 exhibits an annular projection 24 suitable for being seated in an annular undercut slot in the containment seat 18, to connect said ring 19 to the walls of seat 18 forming a contrast to the axial deformation of the scraper means 17.

Advantageously, said containment ring 19 exhibits a containment surface facing the scraper means 17, said surface being substantially orthogonal to the action surface 25 of the scraper means 17.

Preferably, said containment surface of the containment ring 19 extends up to brush without contact against the opposed sealing surface 13.

Advantageously, the containment ring 19 abuts pressure-wise on the sealing surfaces 13.

Said containment ring 19 presses said scraper means 17 to pack against the opposed side surface of the containment seat 18, avoiding any substantial axial deformation of the scraper means 17.

According to an embodiment, said containment ring 19 is made of synthetic material. Preferably, said containment ring 19 is made of Teflon™. Advantageously, said scraper means 17 are of EPDM 80.

According to an embodiment, said scraper means 17 exhibit annular shape with rectangular cross section, and preferably square.

Advantageously, the containment seat 18 of the scraper means 17 exhibits a bottom and at least one side wall.

Preferably, said side wall of the containment seat 18 of the scraper means extends up to brush without contact the opposed sealing surface 13.

Advantageously, said side wall of the containment seat 18 of the scraper means 17 is arranged substantially orthogonal to the action surface 25 of the scraper means 17.

According to an embodiment, said cylinder-piston unit comprises sealing means 26. Said sealing means 26 are seated in a seat 27 provided in piston 8 and act against a side surface of the piston seat 7.

According to an embodiment, said sealing means 26 are seated in a seat 27 provided in the seat of piston 7 of the calliper body 2 and act on said piston 8.

Advantageously, said sealing means 26 are seated in their seat so as to not undergo substantial axial deformations during the movement of piston 8.

Preferably, said seat 27 for the sealing means 26 comprises a slot having a bottom portion and side walls arranged substantially orthogonal to the surface on which said sealing means 26 act.

According to an embodiment, said sealing means 26 comprise an o-ring gasket 28. Advantageously, said sealing means 26 comprise a containment ring 29 having opposed side walls slidingly fitted into said seat 27 of the sealing means. Preferably, said containment ring 29 exhibits a surface opposed to its seat, substantially parallel to the surface on which the sealing means 26 act. Advantageously, said containment ring 29 forms a sliding block supporting the surface on which the sealing means act. Preferably, said containment ring 29 is made of TURCON™.

According to an embodiment, piston 8 exhibits a compression stopping surface 20 suitable for cooperating with a counter-compression stopping surface 21 for limiting the maximum compression of the elastic means 14 during the extraction of piston 8 from seat 7 thereof.

Advantageously, the piston exhibits a stopping abutment 15 cooperating with a stopping surface 16 for limiting the roll-back of piston 8 into seat 7 thereof when stressed by the action of the elastic means 14.

Preferably, the distance between the maximum compression abutment 20 of the elastic means and the stopping abutment 15 to the roll-back of piston 8 into seat 7 thereof exhibits a value of a predetermined extent.

Advantageously, the distance between the maximum compression abutment 20 of the elastic means and the stopping abutment 15 to the roll-back of piston 8 into seat 7 thereof is adjustable.

According to an embodiment, the body of piston 9 comprises a bottom disc 30 and a cylindrical bottom extension 31, cooperating with a cylindrical thrust extension 32 ending with a thrust element 33.

Advantageously, said cylindrical bottom extension 31 exhibits a predetermined axial extension.

Advantageously, said cylindrical thrust extension 32 exhibits a predetermined axial extension.

According to an embodiment, said thrust element 33 comprises a pad support ring.

Preferably, said thrust element comprises a radiator body. Advantageously, said thrust element 33 comprises cooling air flow means and/or operating seats 34 for piston 8 and pads 6.

According to an embodiment, said piston body comprises at least two components: a bottom body 35 and a pad support body or thrust body 36.

Advantageously, said bottom body 35 comprises a bottom disc 30 and a cylindrical bottom extension 31 as well as adjustable connection means 37.

Advantageously, said pad support body 36 comprises a pad support element or thrust element 33 and a cylindrical thrust extension 32, as well as connection counter-means 38.

Preferably, said connection means 37 and connection counter-means 38 comprise threaded portions for an adjustable threaded connection.

According to an embodiment, spacers 39, for example calibrated, are provided between said bottom body 35 and said thrust body 36 to adjust the reciprocal distance thereof.

According to an even further embodiment, said cylindrical bottom extension 31 is connected to said cylindrical thrust extension 32 so as to adjust the distance between the compression abutment 20 of the elastic means 14 and the stopping surface of piston 15.

Advantageously, said bush 10 is seated between said bottom disc 30 and said thrust element 33.

Preferably, said bush 10 exhibits a predetermined axial extension.

Advantageously, a first end of bush 10 comprises an abutment surface 16 suitable for cooperating with the piston stopping surface 15.

Even more advantageously, a second end of bush 10 comprises a counter-abutment surface 21 to the compression of the elastic means suitable for cooperating with the compression abutment 20 of the elastic means 14 of piston 8.

According to an embodiment, said bush comprises a seat 40 suitable for seating elastic means 14.

Advantageously, said seat 40 is comprised within the end of bush 10 opposed to pads 6.

Preferably, said bush 10 comprises an undercut seat 40 for the elastic means 14 and an extension comprising at the end thereof a counter-abutment surface 21 for limiting the compression of the elastic means 14.

According to an embodiment, said bush 10 is fitted externally to piston body 9 and is slidingly seated into a slot 22 provided at the access end of the piston seat 7.

Preferably, said slot for bush 22 exhibits a predetermined axial depth.

Advantageously, said slot 22 exhibits a bottom wall comprising an abutment surface 16 suitable for limiting the roll-back of piston 8 stressed by the elastic means 14.

According to an embodiment, said slot 22 seating bush 10 is closed with a stopping element 23 connected to the slot walls so as to be a contrast to the thrust of the elastic means 14.

Advantageously, said stopping element 23 is adjustably connected to the slot.

According to an embodiment, said stopping element comprises a stopping ring 23.

Advantageously, said stopping element 23 exhibits an outer threading 41 suitable for cooperating with an inner threading provided into the slot wall.

Preferably, said stopping element comprises a seat 40 into the end thereof facing the bush for seating the elastic means 14.

According to an embodiment, said stopping element 23 comprises at an end thereof a counter-abutment surface 21 suitable for cooperating with an abutment 20 provided into bush 10 for limiting the compression of elastic means 14 during the extraction of piston 8 from seat 7 thereof.

Advantageously, the distance between the roll-back abutment surface 16 provided at the bottom of slot 22 and the counter-compression abutment surface 21 of elastic means 14 provided in the stopping element 23 is of a predetermined extent.

Preferably, the distance between the roll-back abutment surface 16 provided at the bottom of slot 22 and the counter-compression abutment surface of elastic means 21 provided in the stopping element 23 is adjustable.

According to an embodiment, the stopping element 23 exhibits connecting means to operating members 42 for the adjustment thereof inside the slot for bush 22.

According to an embodiment, a brake calliper 1 comprises at least two devices for adjusting the roll-back of cylinder-piston units arranged opposed to one another.

According to an even further embodiment, a calliper comprises a calliper body having an elongated portion on the hub side 43 suitable for facing the side of a brake disc 3 facing a hub of a vehicle, an elongated portion of the wheel side 44 suitable for facing the side of the brake disc 3 facing a wheel of the vehicle and at least two end bridges 45 suitable for connecting the ends of said elongated portions on the hub side 43 and on the wheel side 44.

Advantageously, the elongated portions on the hub side 43 and on the wheel side 44 and the at least two end bridges 45 are integral.

According to an embodiment, a bush 10 exhibits relieves or longitudinal lightening relieves 46.

According to an embodiment, a bush 10 longitudinal holes.

According to an embodiment, a bush 10 internally exhibits axial lightening slots 46.

Advantageously, inner tips 47 of the walls delimiting said lightening slots 46 form a guiding surface for bush 10.

According to an embodiment, said thrust element 33 of piston 8 suitable for acting on the pad comprises a disc element provided with radial arms 48.

Advantageously, said radial arms 48 are jointed to each other.

According to an even further embodiment, said piston 8 is stressed out of seat 7 thereof by gearmotor means. Advantageously, said gearmotor means comprise an electrical motor.

An operating mode of a calliper comprising a piston roll-back device is described below.

Following the application of a pressure on the piston body, for example increasing the pressure exerted by the brake fluid poured into the chamber delimited between the cylinder or piston seat and the piston body, the piston body partly comes out of its seat.

The elastic means constantly apply an elastic return action on the piston body, action suitable for constantly influencing it to roll-back inside its seat.

During the extraction movement of the piston from its seat, since the scraper element is contained into its seat so that, when stressed, it undergoes no substantial axial deformation and since this scraper element applies a pressure on a sealing surface of the piston suitable for exerting a scraping action and an axial friction action substantially stronger than said elastic return action of the elastic means, when the piston body comes out the elastic return action is overcome without said scraper element undergoing any substantial axial deformation and at first, a relative sliding between said scraper element and said sealing surface is avoided, until said elastic means are packed or said piston reaches an abutment surface, to then allow a relative sliding between said scraper element and said sealing surface of the piston, so as to allow as pressure of the pad on the braking surface of the disc, to exert the desired braking action and optionally compensate the wear of the brake pad.

Once the desired braking action has ended, the pressure exerted on the piston body by the brake fluid is released and, through the elastic action of the elastic means, the piston body is returned into its seat provided in the calliper.

According to a particular operating mode, the return of the piston body is stopped against an abutment so as to have a return stroke of the piston into the calliper by a predetermined extent (FIGS. 13 to 16).

Figure 1:
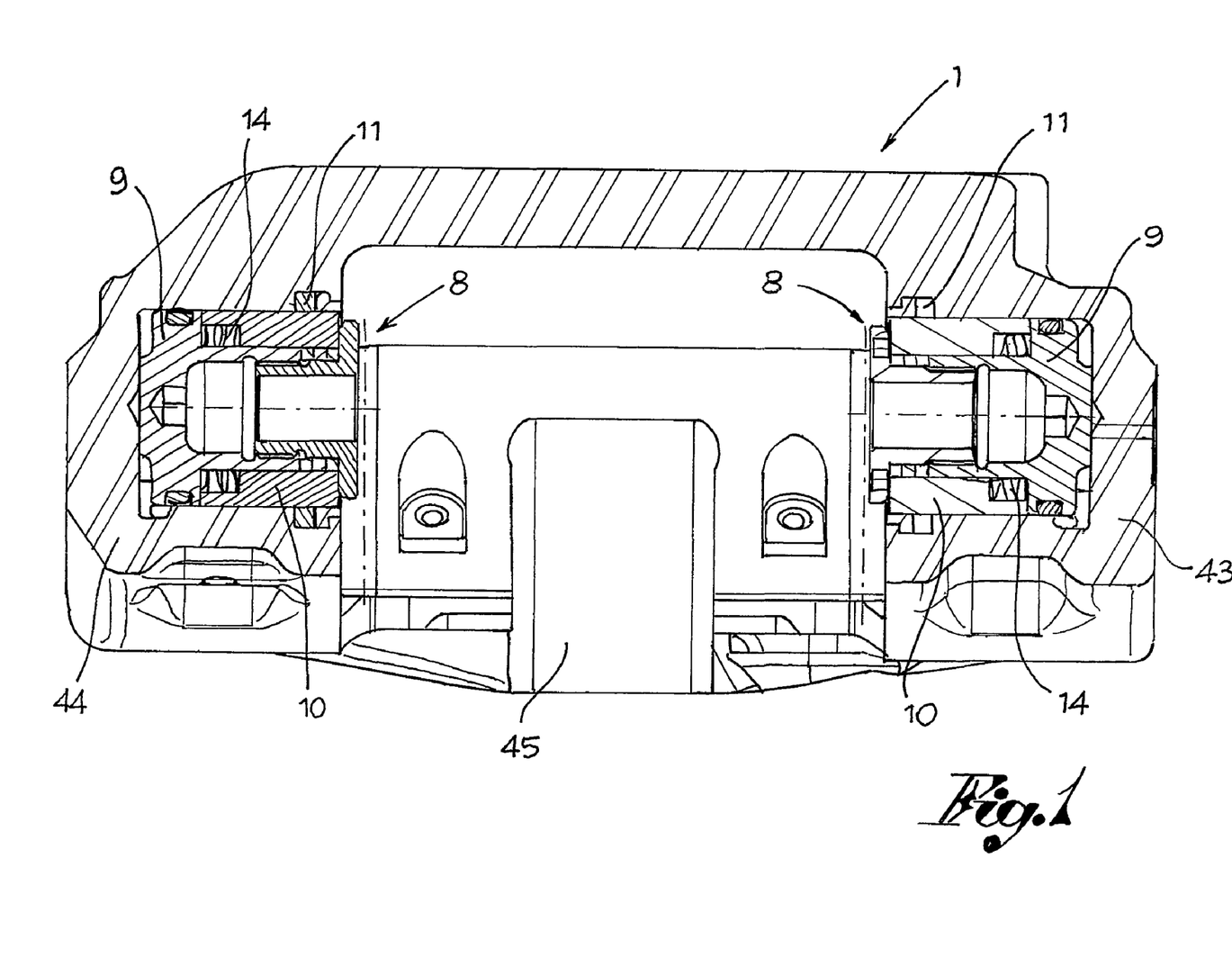
FIG. 1 shows a cross or axial section of a brake calliper at the axis of a cylinder and piston device for stressing the pads.
Figure 2:
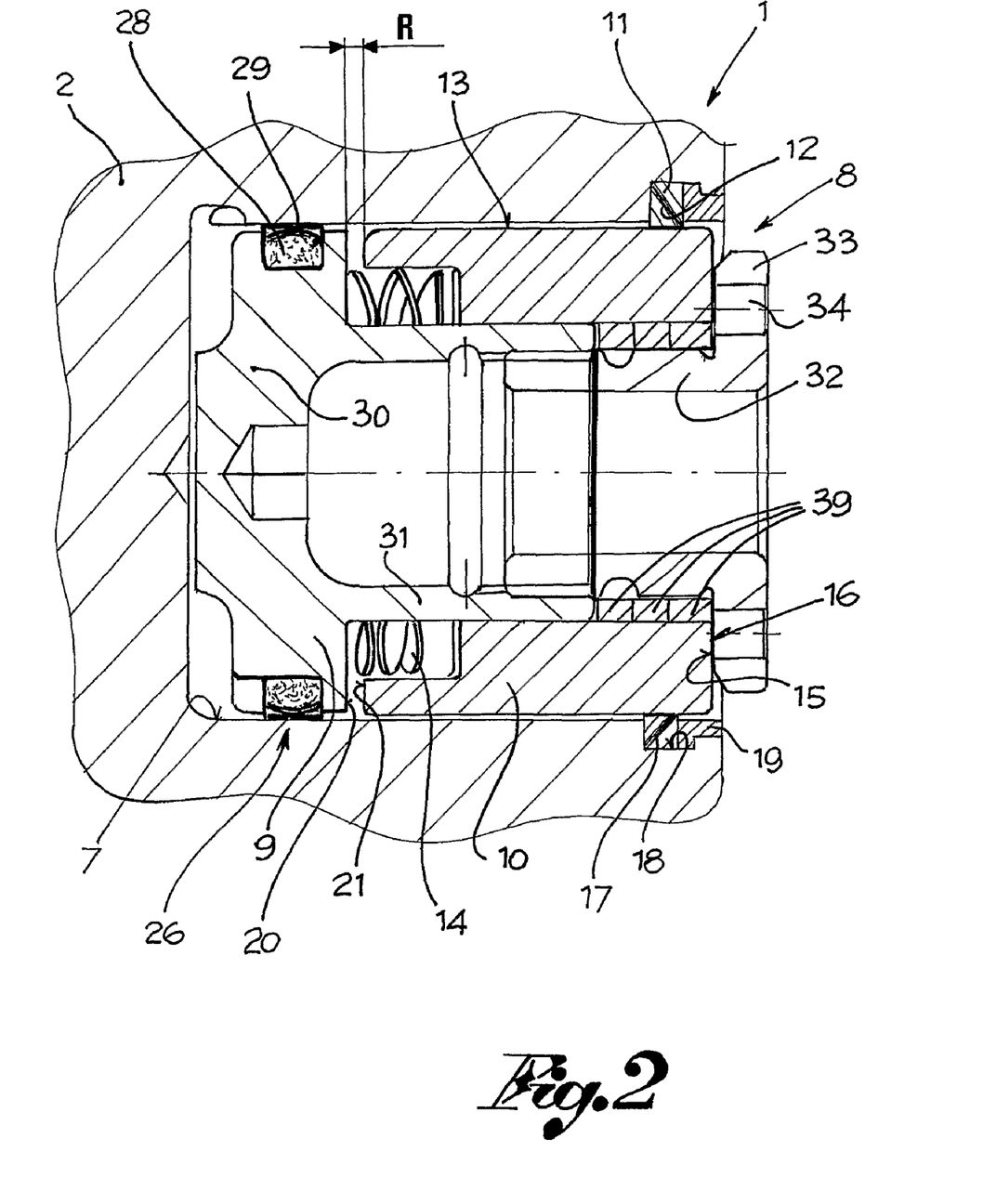
FIG. 2 shows a section detail of a cylinder and piston device of a calliper.
Figure 3:
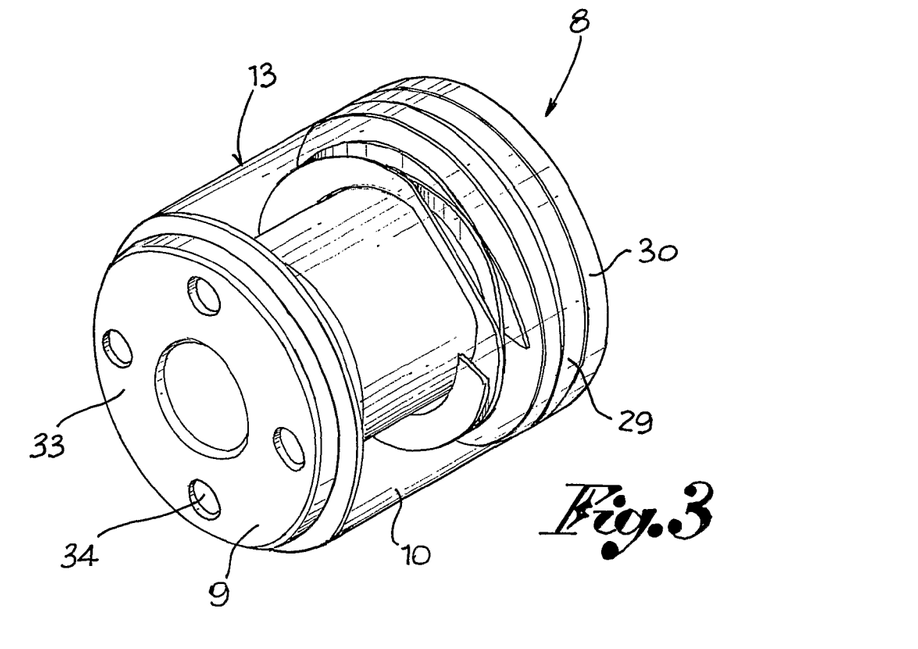
FIG. 3 shows an axonometric view of just the piston of FIG. 2, wherein the bush is shown in transparency to make out the components arranged thereunder.
Figure 4:
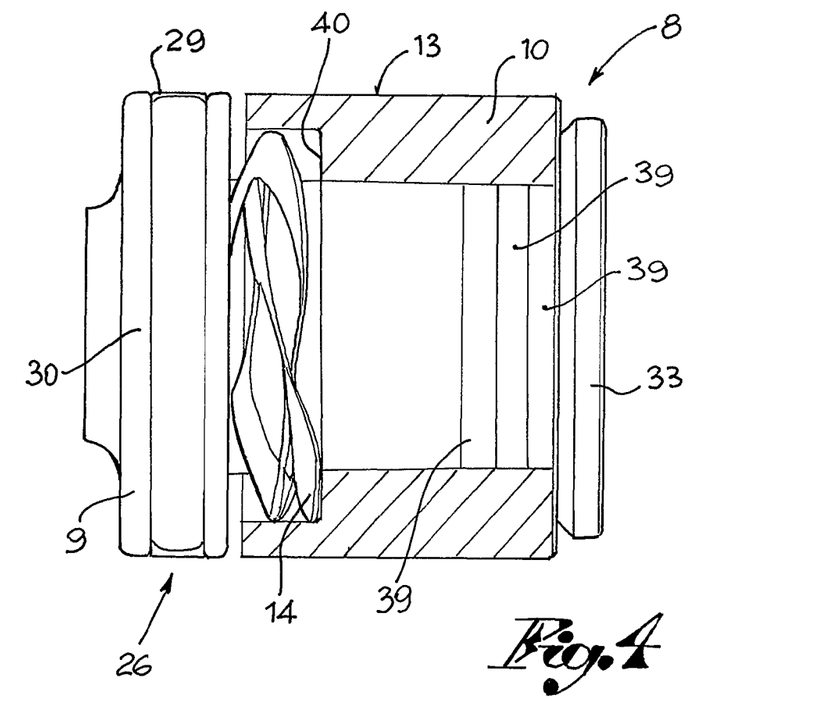
FIG. 4 shows a side view of the piston of FIG. 3, with cutaway bush.
Figures 5, 8, 9, 10, 11:
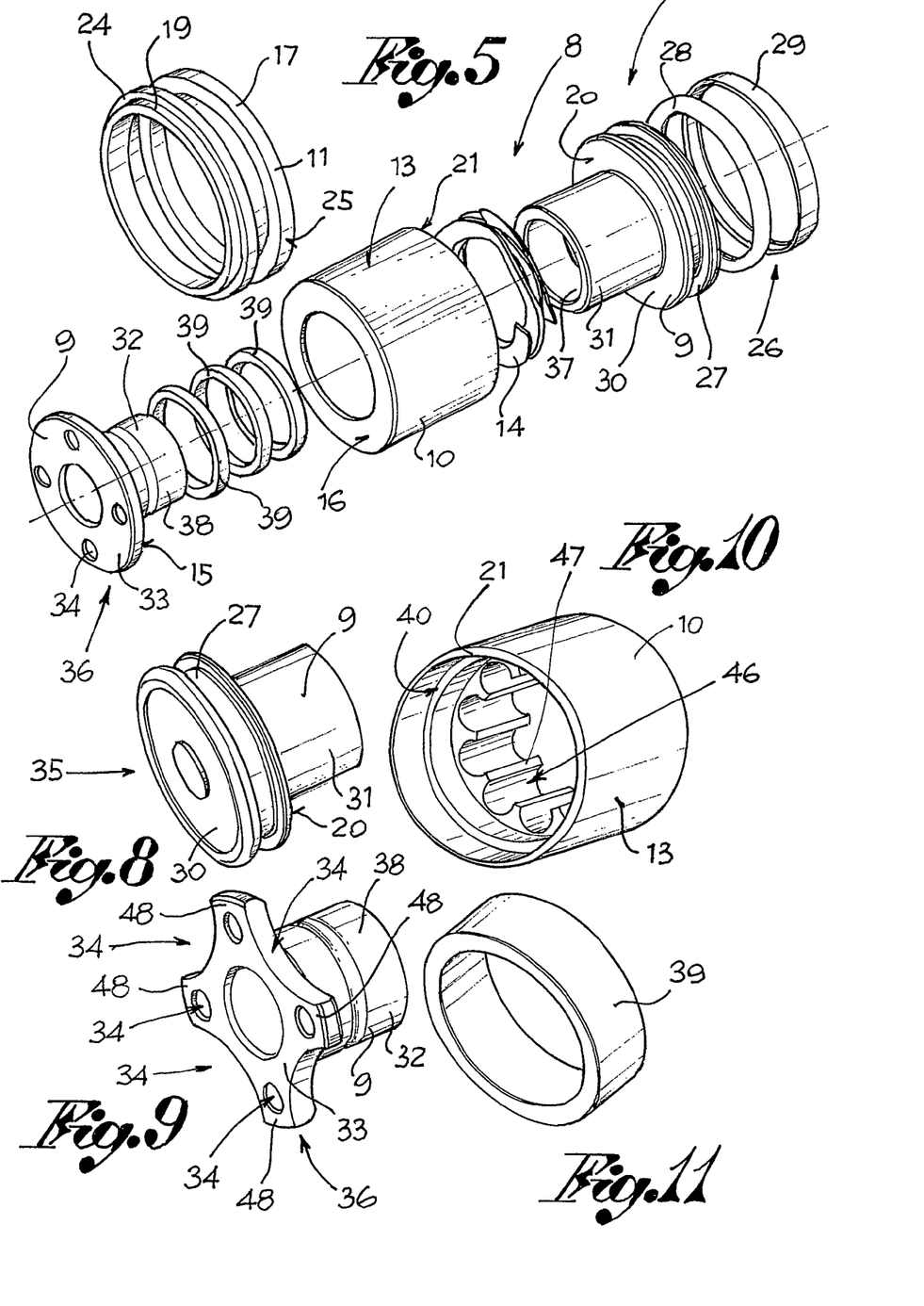
Figure 6:
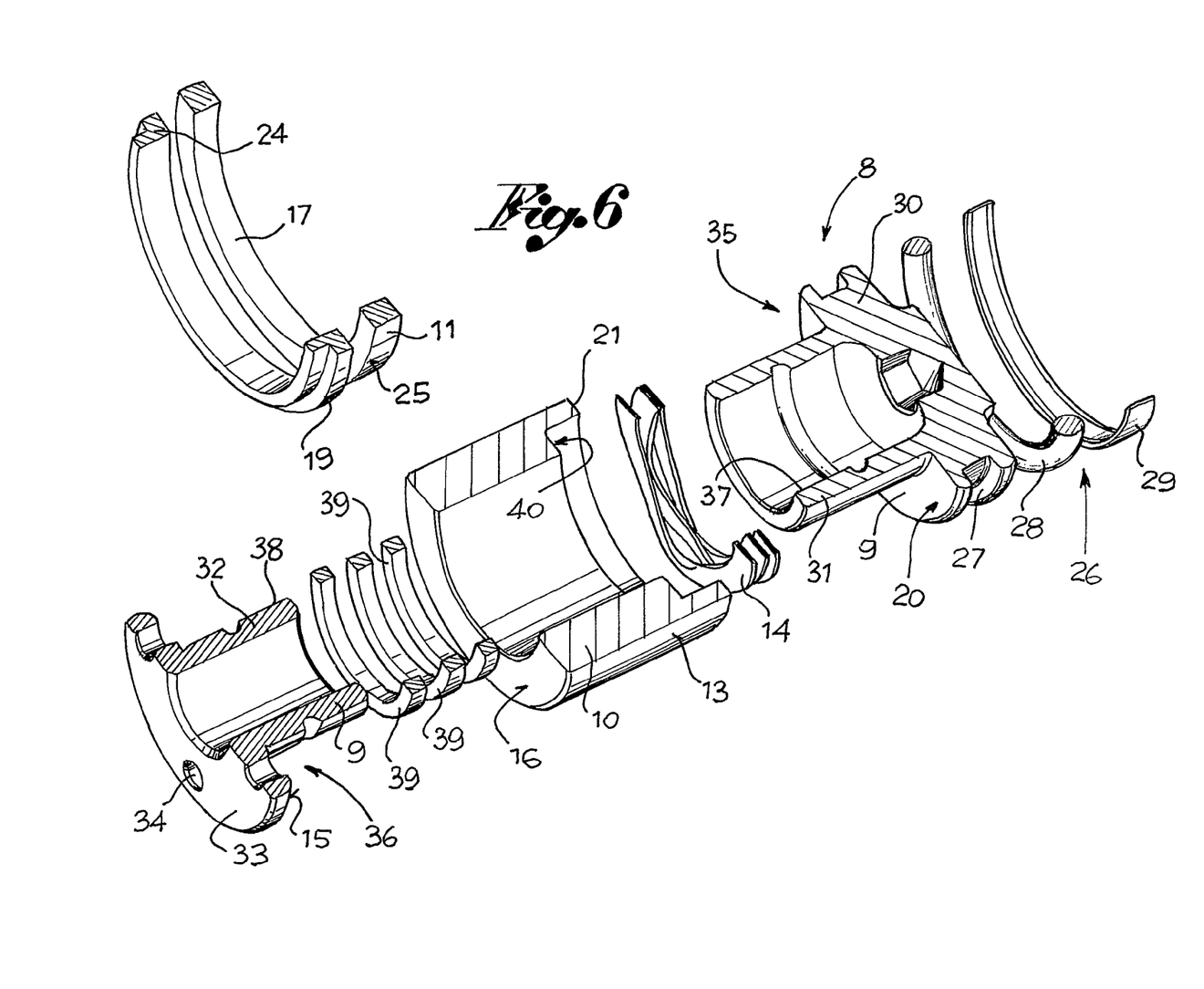
FIG. 6 shows an axonometric exploded partly cutaway view of the components of the piston and of the scraper element of FIG. 5.
Figure 7:
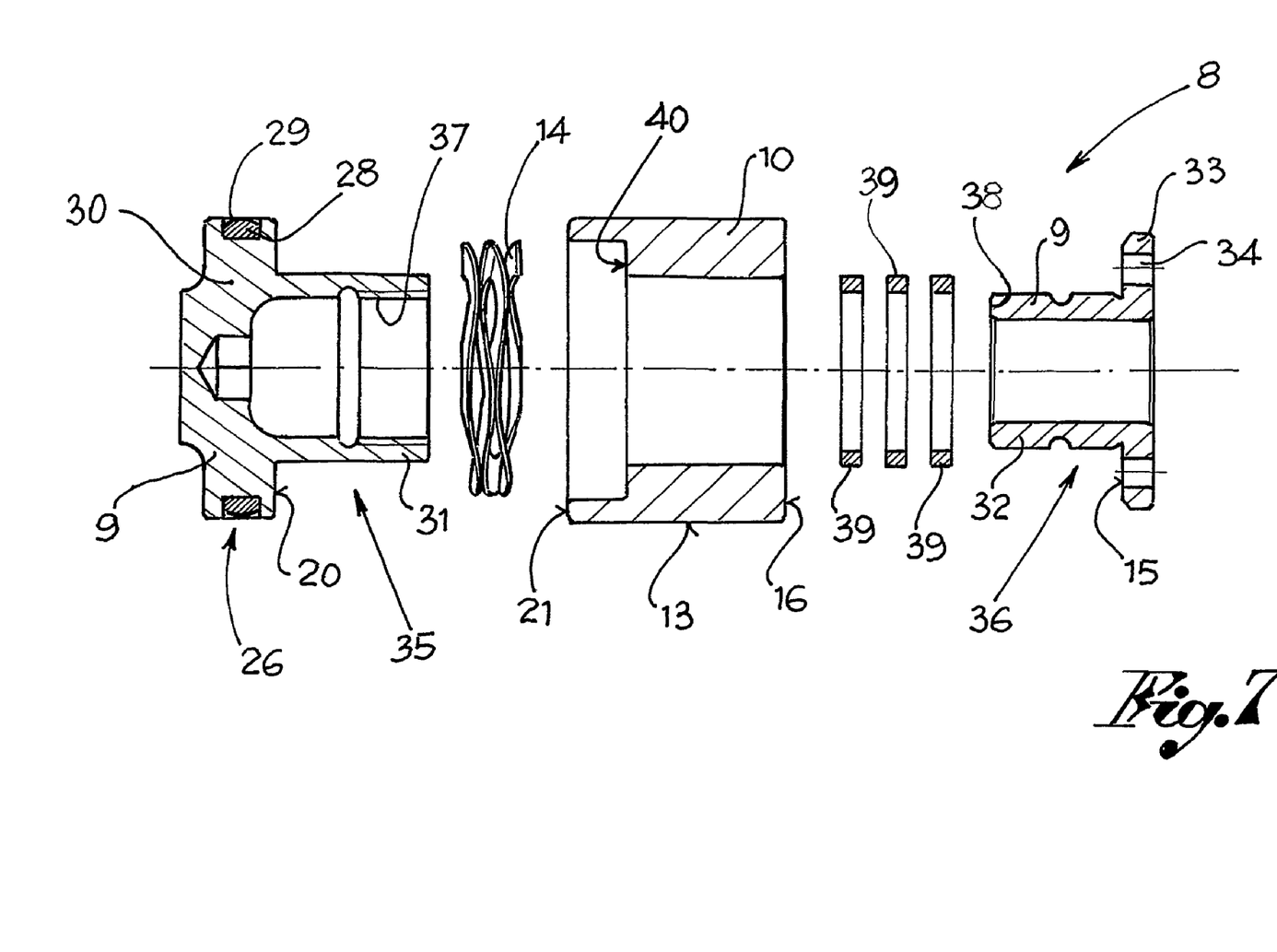
FIG. 7 shows a side exploded cutaway view of the piston of FIG. 3, FIG. 8 to 11 show axonometric views of a piston according to a further embodiment.
Figure 12:
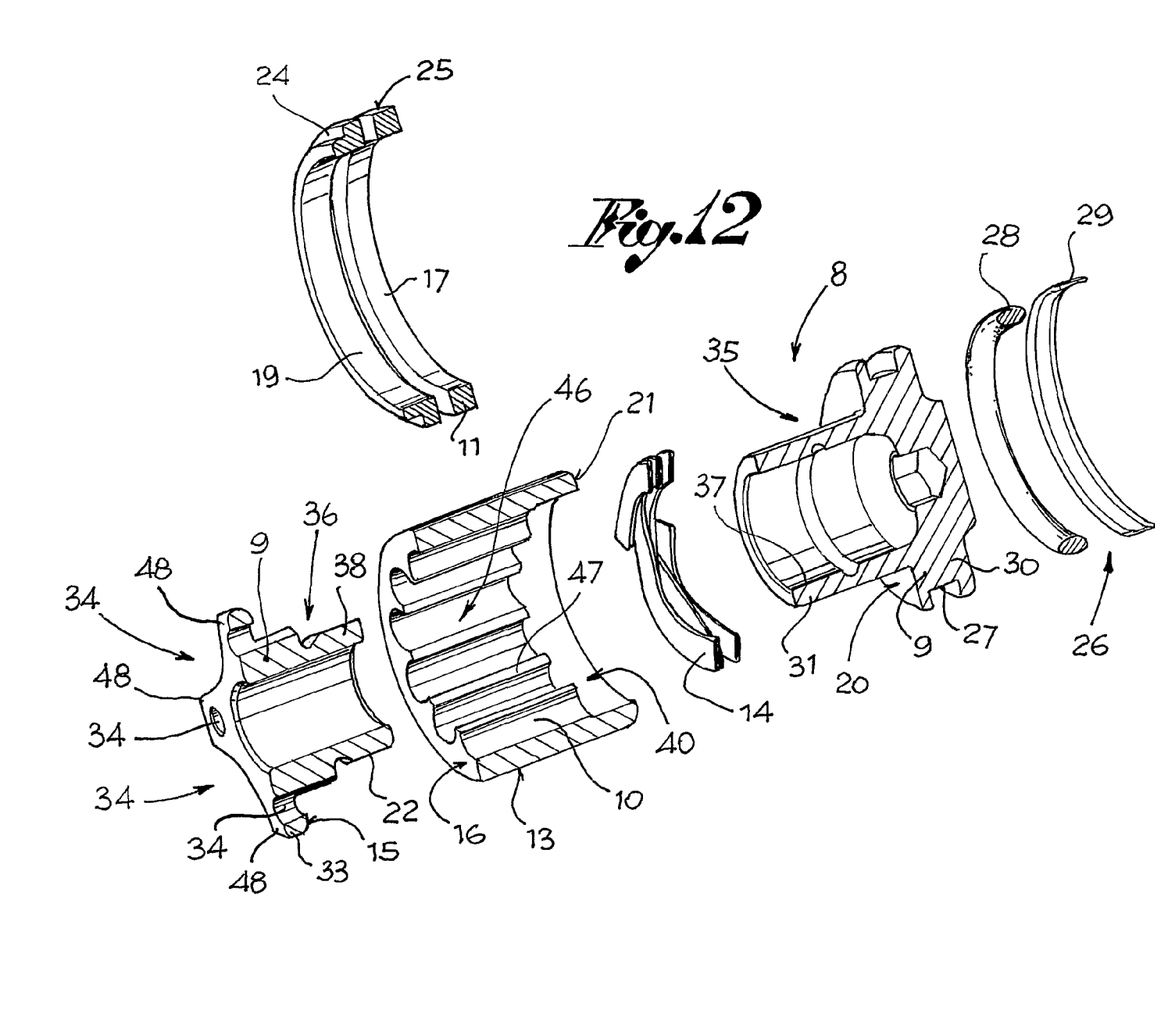
FIG. 12 shows an axonometric exploded partly cutaway view of the components of the piston of FIGS. 8 to 11 and of a respective scraper element.
Figures 13, 14:
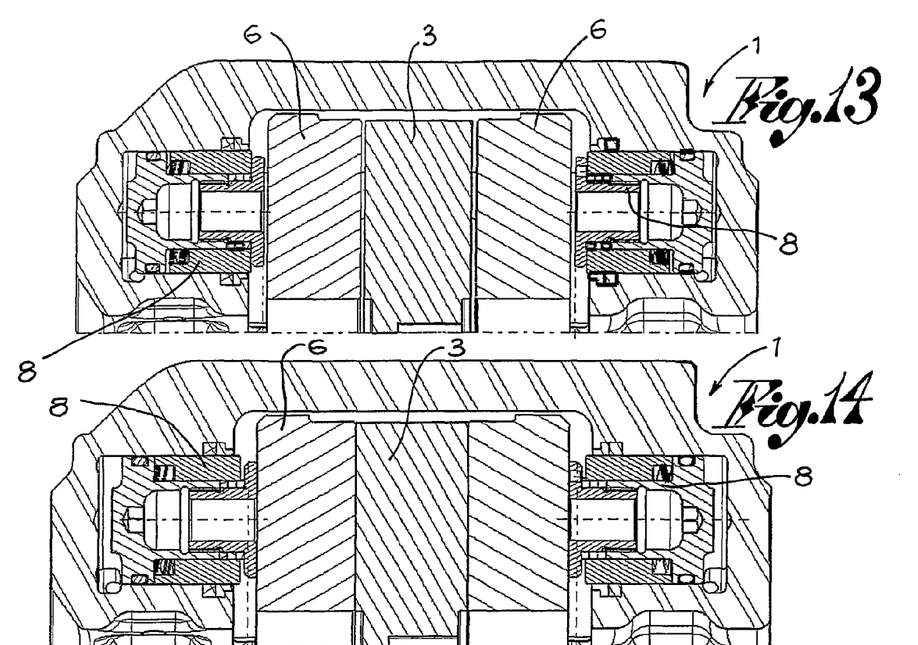
FIGS. 13 to 16 show a cross section view of a brake calliper at the cylinder-piston unit, in four operating steps.
Figure 15:
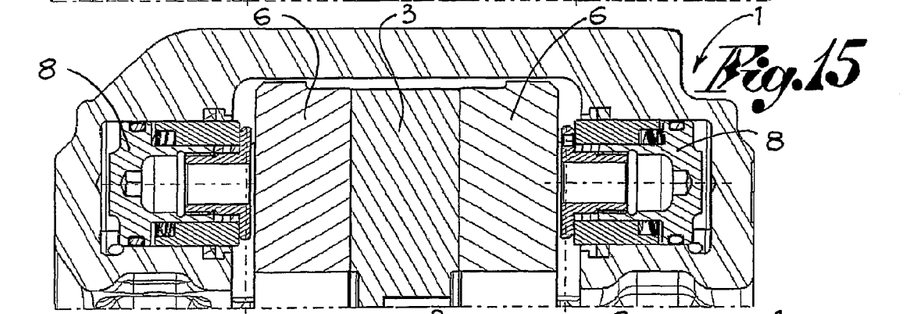
Figure 16:
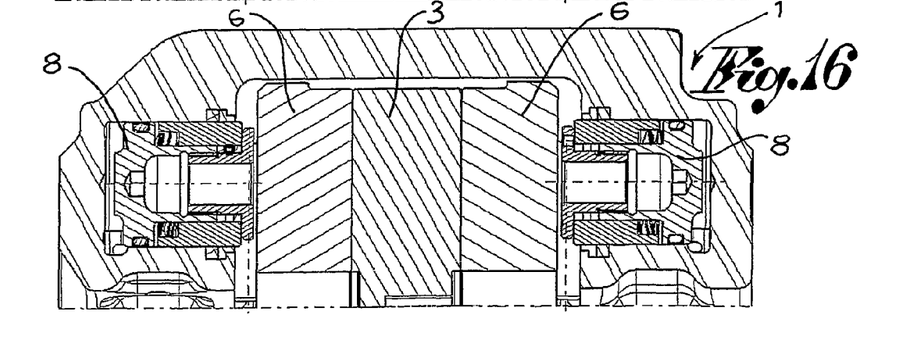
Figure 17:
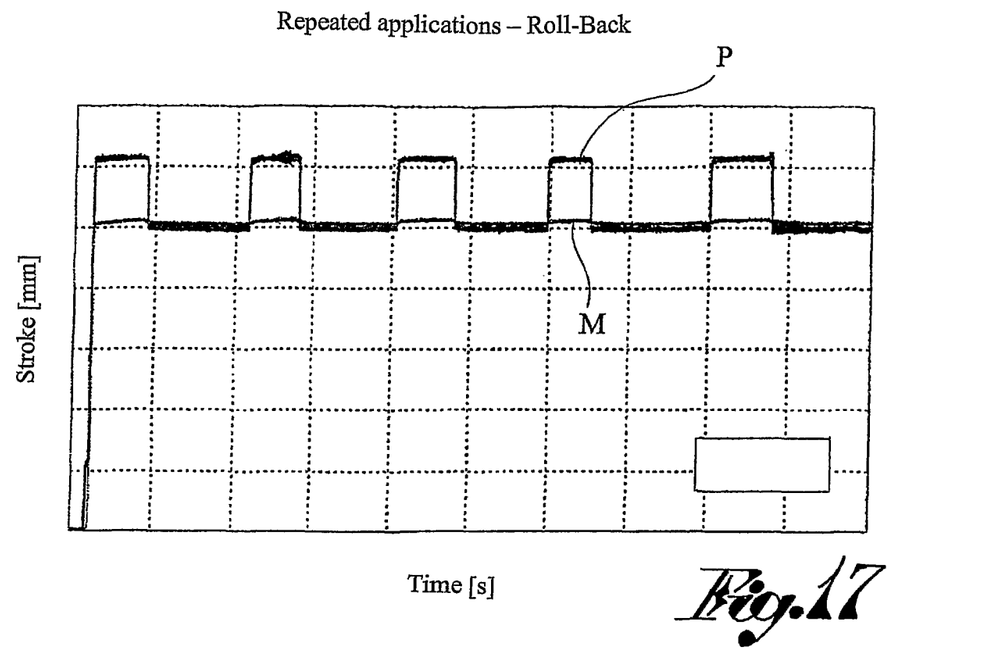
FIG. 17 shows a diagram with the experimental results of the operation of an experimental prototype of a calliper provided with a device for controlling the piston roll-back, wherein the abscissa shows the time and the ordinate shows the stroke of the piston body P and of bush M in mm.
Figure 18:
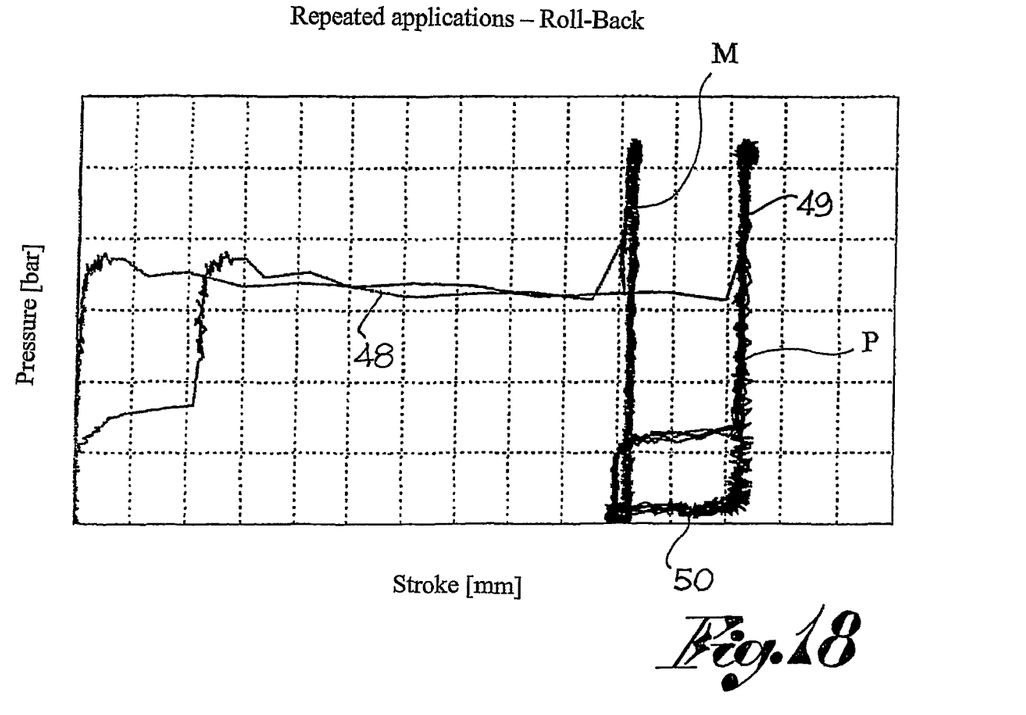
FIG. 18 shows a diagram with the experimental results of the operation of an experimental prototype of a calliper provided with a device for controlling the piston roll-back, wherein the abscissa shows the stroke in mm of the piston body P and of bush M, and the ordinate shows the pressure exerted on the piston body by the brake fluid fed to the cylinder-piston chamber, expressed in bar.

As it can also be seen in FIGS. 17 and 18, the proposed device allows having a special braking immediacy, and at the same time, accurate control of the piston roll-back.

In particular, the operating repeatability of the device is especially high.

AS it can also be seen in FIG. 18, after applying a relative pressure to the piston body, the latter recovers the clearance between the thrust element and the pads (indicated with reference numeral 48) and then it abuts on the pads and applies the braking action request to the brake disc (indicated with reference numeral 49). At the end of the brake fluid action on the piston, the elastic means return the piston into its seat, up to the abutment (indicated with reference numeral 50) exhibiting a special operating repeatability, also as the working conditions of the brake calliper vary.

Some examples of adjustment of a piston roll-back are described below.

A possible method of adjusting the extent of roll-back of a brake calliper piston comprises the steps of:
  providing a brake calliper as described above, and
  changing the extent of the stroke of the piston elastic return means.

According to a different method, a method of adjusting the extent of roll-back of a brake calliper piston comprises the steps of:
  providing a brake calliper as described above, and
  changing the relative position of the maximum compression abutment of the elastic means 20 and of the piston stopping surface 15.

According to a further method, a method of adjusting the extent of roll-back of a brake calliper piston comprises the steps of:
  providing a brake calliper as described above, and
  using elastic means with a predetermined elastic constant.

A further method of adjusting the extent of roll-back of a brake calliper piston comprises the steps of:
  providing a brake calliper as described above, and
  changing the extent of the scraping action of the scraper element, changing the extent of the pressure it exerts on the sealing surface 13 of the piston.

An operating mode for the piston roll-back by a predetermined extent is described below. This method comprises the steps of:
  providing a brake calliper as described above, and
  zeroing the relative pressure applied by the brake fluid to the piston,
  acting with a scraper element on the piston so as to act with scraper element on the piston so that no substantial relative sliding between the scraper element and the sealing surface on which it acts occurs,
  acting with the elastic means so as to return the piston into the piston seat up to moving the stopping surface of the piston in abutment against the abutment surface.

Thanks to what described above, it can be understood that it is especially easy to adjust a brake calliper to have a desired roll-back even in very different working conditions. It is even possible to differently adjust also different devices present in the same calliper or in the callipers of a same motor vehicle, in order to have a more effective behaviour of the entire braking system.

A man skilled in the art may make several changes, adjustments and replacements of elements with other functionally equivalent ones to the preferred embodiment of the device described above, in order to meet specific and incidental needs, without departing from the scope of the following claims.

The invention claimed is:

1. In a brake caliper comprising a caliper body to be arranged astride a brake disk having an axis of rotation and opposed friction surfaces, pads for acting on said friction surfaces, and at least one piston seat containing a piston for moving at least one of said pads against said friction surfaces of the brake disc when said piston is driven towards said pad by application of hydraulic pressure, the improvement comprising
  a device for controlling roll-back of the piston when said pressure is released, said device comprising:
  a bush arranged externally of and coaxially with said piston,
  a scraper element seated in a first seat formed in a surface of the piston seat, said first seat substantially preventing deformation of the scraper element in a piston movement direction during piston operation,
  said scraper element bearing against said bush with a pressure determining a frictional resistance force to piston movement,
  elastic means disposed between the piston and the bush and elastically acting on the bush and, when stressed by the piston movement, elastically yielding up to an abutment position,
  said elastic means having a predetermined elastic constant that determines an elastic return force of the piston into its seat, said elastic return force being substantially less than the frictional resistance force exerted by said scraper element,
  whereby, during movement of the piston, said scraper element slides relative to the piston only after the elastic means have reached said abutment position, preventing further deformation as the piston slides relative to the scraper element, and
  a seal disposed in a second seat formed in said piston and bearing against a side surface of the piston seat.

2. A brake caliper according to claim 1, wherein said piston has a stopping surface which engages an abutment surface for limiting the return of the elastic means into the piston seat to a predetermined extent.

3. A brake caliper according to claim 1, wherein an active end of the scraper element has an action surface in pressure contact with an opposed sealing surface and wherein said scraper element comprises containment means suitable for containing said scraper element in the first seat, preventing it from axially deforming during the movement of the piston.

4. A brake caliper according to claim 1, wherein the first seat of the scraper element has a bottom and at least one side wall and wherein said side wall of the first seat of the scraper element extends up to the opposed sealing surface.

5. A brake caliper according to claim 1, wherein said seal is seated in the second seat so as to not undergo substantial axial deformations during movement of the piston.

6. A brake caliper according to claim 1, wherein said second seat formed in the piston for the seal comprises a slot having a bottom portion and side walls arranged substantially orthogonal to a surface on which said seal acts.

7. A brake caliper according to claim 1, wherein said seal comprises an o-ring gasket and a containment ring having opposed side walls slidingly fitted into said second seat.

8. A brake caliper according to claim 1, wherein said piston has a compression stopping surface suitable for cooperating with a counter-compression stopping surface for limiting the maximum compression of the elastic means during the extraction of the piston from its seat and wherein the piston has a stopping abutment cooperating with a stopping surface for limiting the roll-back of the piston into its seat when stressed by the action of the elastic means and wherein the distance between the maximum compression abutment of the elastic means and the stopping abutment to the roll-back of the piston into its seat has a value of a predetermined extent.

9. A brake caliper according to claim 1, wherein the distance between the maximum compression abutment of the elastic means and the stopping abutment to the roll-back of piston into its seat is adjustable.

10. A brake caliper according to claim 1, wherein said piston body comprises at least two components:
   a bottom body and
   a pad support body,
   wherein said bottom body comprising a bottom disc and a cylindrical bottom extension as well as adjustable connection means.

11. A brake caliper according to claim 10, wherein said bush is seated between said bottom body and said pad support body and wherein said bush has a predetermined axial extension, wherein a first end of the bush comprises an abutment surface and a second end of the bush comprises a counter-abutment surface to the compression of the elastic means suitable for cooperating with the compression abutment of the elastic means of the piston.

12. A brake caliper comprising:
   a caliper body arranged astride of a brake disc comprising an axis of rotation and opposed friction surfaces,
   pads seated in said caliper body so as to axially slide relative to the brake disc to act against said friction surfaces,
   at least one piston seat formed in the caliper body,
   a seal seated in a first seat provided in the piston and acting against a side surface of the piston seat,
   at least one piston sealingly seated in said piston seat so as to be driven by a brake fluid out of said piston seat for driving at least one of said pads against the opposed friction surface of the brake disc,
   said piston comprising a piston body and a bush coaxial to said piston body,
   said bush being arranged externally to said piston body and having an outer sealing surface,
   a scraper element seated in a second seat provided in a surface of the piston seat so as to act pressure-wise against said sealing surface of the bush, said second seat being further shaped so as to substantially prevent an axial deformation of the scraper element during a relative sliding movement between said scraper element and said sealing surface,
   elastic means provided between said bush and said piston body suitable for elastically and axially driving said bush and said piston body apart,
   said elastic means, when stressed by the movement of the piston, elastically yielding up to packing or to moving said piston body in an abutment position against said bush,
   said elastic means exhibiting a predetermined elastic constant that determines an elastic action on the piston substantially weaker than the axial friction action exerted by the scraper element so that, when the piston is stressed out of its piston seat, the piston body packs said elastic means or moves in abutment against said bush before a relative sliding occurs between said scraper element and said outside sealing surface of the bush.

13. A caliper according to claim 12, wherein said piston body comprises a stopping surface suitable for interacting with an abutment surface of the bush for limiting the return of said piston body by said elastic means into said piston seat to a predetermined extent.

* * * * *